US010455090B2

United States Patent
McCarthy-Howe et al.

(10) Patent No.: US 10,455,090 B2
(45) Date of Patent: Oct. 22, 2019

(54) INTERMEDIARY DEVICE FOR DATA MESSAGE NETWORK ROUTING AND ENHANCEMENT IN A CONTACT CENTER ENVIRONMENT

(71) Applicant: TEN DIGIT Communications LLC, Simsbury, CT (US)

(72) Inventors: Thomas Spencer McCarthy-Howe, West Barnstable, MA (US); Gary George Brandt, Simsbury, CT (US)

(73) Assignee: TEN DIGIT COMMUNICATIONS LLC, Simsbury, CT (US)

( * ) Notice: Subject to any disclaimer, the term of this patent is extended or adjusted under 35 U.S.C. 154(b) by 0 days.

(21) Appl. No.: 15/411,534

(22) Filed: Jan. 20, 2017

(65) Prior Publication Data
US 2017/0230505 A1 Aug. 10, 2017

Related U.S. Application Data

(60) Provisional application No. 62/291,049, filed on Feb. 4, 2016.

(51) Int. Cl.
*H04M 3/00* (2006.01)
*H04M 3/51* (2006.01)
(Continued)

(52) U.S. Cl.
CPC .......... *H04M 3/5183* (2013.01); *H04L 51/08* (2013.01); *H04L 51/18* (2013.01); *H04M 3/5141* (2013.01);
(Continued)

(58) Field of Classification Search
CPC ............. H04M 3/5191; H04M 3/5175; H04M 3/42221; H04M 3/5183; H04M 3/5233;
(Continued)

(56) References Cited

U.S. PATENT DOCUMENTS

| 4,825,435 A | 4/1989 | Amundsen et al. |
| 8,463,304 B2 | 6/2013 | Lauer et al. |

(Continued)

OTHER PUBLICATIONS

International Search Report and Written Opinion for PCT/US2017/014385 dated Apr. 7, 2017.

*Primary Examiner* — Antim G Shah
*Assistant Examiner* — Kharye Pope
(74) *Attorney, Agent, or Firm* — Foley & Lardner LLP; James De Vellis

(57) ABSTRACT

An intermediary device to enhance and route data messages between end user and contact center agent computing devices in a contact center environment is provided. The intermediary device can be disposed in a data communication path of a contact center between an electronic communications network and a contact center agent computing device. The intermediary device can include a data message replication mechanism, a data message aggregator mechanism, or a data message analysis mechanism. The intermediary device can receive a data message. The data message replication mechanism can intercept and replicate the data message to generate a replicated data message. The data message analysis mechanism can generate, from the replicated data message, derivative content. The data message aggregator mechanism can combine the derivative content with the data message to create an enhanced data message that can be provided to the contact center agent computing device in the contact center environment.

20 Claims, 9 Drawing Sheets

(51) Int. Cl.
*H04L 12/58* (2006.01)
*H04M 7/00* (2006.01)
*H04L 12/66* (2006.01)

(52) U.S. Cl.
CPC ...... *H04M 7/0042* (2013.01); *H04M 2201/22* (2013.01); *H04M 2201/42* (2013.01)

(58) Field of Classification Search
CPC .. H04M 2203/551; H04M 3/523; H04M 3/51; H04M 3/42161; H04M 3/5232; H04M 7/006; H04M 2203/655; H04M 3/4365; H04M 2201/42; H04M 2203/2038; H04M 3/4205; G06Q 30/016; G06Q 30/01; G10L 15/26
USPC ............ 379/265.09, 265.12, 265.06, 265.13, 379/93.01, 265.02, 142.04, 142.1, 266.1; 370/352; 709/203, 206
See application file for complete search history.

(56) References Cited

U.S. PATENT DOCUMENTS

| | | | | |
|---|---|---|---|---|
| 8,843,563 | B1* | 9/2014 | Hartman | G06Q 10/06 709/206 |
| 9,106,724 | B1* | 8/2015 | Harris | H04L 51/16 |
| 2002/0138522 | A1 | 9/2002 | Muralidhar et al. | |
| 2003/0065727 | A1* | 4/2003 | Clarke | H04L 51/066 709/206 |
| 2004/0189710 | A1 | 9/2004 | Goulden et al. | |
| 2007/0036284 | A1* | 2/2007 | Raghav | H04M 1/575 379/67.1 |
| 2008/0118051 | A1* | 5/2008 | Odinak | H04M 3/42221 379/265.09 |
| 2010/0192207 | A1 | 7/2010 | Raleigh | |
| 2010/0303219 | A1* | 12/2010 | Michaelis | H04M 3/42059 379/93.23 |
| 2011/0116492 | A1* | 5/2011 | Byron | H04M 3/42221 370/352 |
| 2013/0163731 | A1* | 6/2013 | Yan | H04M 3/523 379/85 |
| 2014/0100932 | A1 | 4/2014 | Goldfinger et al. | |
| 2014/0220526 | A1* | 8/2014 | Sylves | G06Q 30/0201 434/238 |
| 2015/0036813 | A1* | 2/2015 | Ananthakrishnan | H04M 7/0027 379/265.09 |
| 2015/0117632 | A1* | 4/2015 | Konig | H04M 3/5233 379/265.12 |
| 2015/0350444 | A1* | 12/2015 | Glass | H04M 3/5232 379/265.13 |
| 2015/0358463 | A1* | 12/2015 | O'Connor | H04M 3/5166 379/88.02 |
| 2016/0036972 | A1* | 2/2016 | Ristock | H04M 3/5175 379/266.1 |
| 2016/0127536 | A1* | 5/2016 | Jayapalan | H04M 3/2281 379/265.02 |

* cited by examiner

INTERMEDIARY DEVICE FOR DATA MESSAGE NETWORK ROUTING AND ENHANCEMENT IN A CONTACT CENTER ENVIRONMENT

CROSS REFERENCE TO RELATED APPLICATION

This application claims the benefit of priority under 35 U.S.C. § 119 to provisional patent application No. 62/291,049, filed on Feb. 4, 2016 and titled "Intermediary Device for Data Message Enhancement", which is herein incorporated by reference in its entirety.

BACKGROUND

Voice based communication between computing devices can be limited to one to one direct communication, with limited ability for many-to-one parallel or concurrent communication.

SUMMARY

At least one aspect is directed to an intermediary device that enhances data messages between end user client computing devices and contact center agent computing devices in a contact center environment. The intermediary device can be disposed in a data communication path of a contact center between an electronic communications network and a contact center agent computing device. The intermediary device can include at least one of a data message replication mechanism, a data message aggregator mechanism, and a data message analysis mechanism. The intermediary device can receive via the electronic communications network, a data message having a characteristic. The data message replication mechanism can intercept the data message and can replicate the data message to generate a replicated data message. The replicated data message can include the characteristic. The data message analysis mechanism can generate, from the replicated data message and based on the characteristic, derivative content. The data message aggregator mechanism can combine the derivative content with the data message to create an enhanced data message. The intermediary device can provide the enhanced data message to the contact center agent computing device in the contact center environment for display by the contact center agent computing device.

At least one aspect is directed to a system that enhances data messages between end user client computing devices and contact center agent computing devices in a contact center environment. The system can include an intermediary device, a data message replication mechanism, a data message aggregator mechanism, and a data message analysis mechanism. The intermediary device can be disposed in a data communication path for a contact center between an electronic communications network and a contact center agent computing device. The intermediary device can receive via the electronic communications network, a data message having a characteristic. The data message replication mechanism can intercept the data message and can replicate the data message to generate a replicated data message. The replicated data message can include the characteristic. The data message analysis mechanism can generate, from the replicated data message and based on the characteristic, derivative content. The data message aggregator mechanism can combine the derivative content with the data message to create an enhanced data message. The intermediary device can provide the enhanced data message to the contact center agent computing device for display by the center agent computing device.

At least one aspect is directed to a method of enhancing data messages routed between end user client computing devices and contact center agent computing devices in a contact center environment. The method can provide an intermediary device in a contact center environment. The intermediary device can be disposed in a data communication path of a contact center between an electronic communications network and a contact center agent computing device. The intermediary device can include at least one of a data message replication mechanism, a data message aggregator mechanism, and a data message analysis mechanism. The method can receive, by the intermediary device via the electronic communications network, from a client computing device, a data message having a characteristic. The method can intercept, by the data message replication mechanism, the data message to generate a replicated data message. The replicated data message can include the characteristic. The method can generate, by the data message analysis mechanism, from the replicated data message and based on the characteristic, derivative content. The method can combine, by the data message aggregator mechanism, the derivative content with the data message to create an enhanced data message. The method can provide, by the intermediary device, the enhanced data message to the contact center agent computing device for display by the contact center agent computing device.

At least one aspect is directed to a computer readable storage medium storing instructions that when executed by one or more data processors, cause the one or more data processors to enhance data messages routed between end user client computing devices and contact center agent computing devices in a contact center environment. The operations can provide an intermediary device in a contact center environment. The intermediary device can be disposed in a data communication path of a contact center between an electronic communications network and a contact center agent computing device. The intermediary device can include at least one of a data message replication mechanism, a data message aggregator mechanism, and a data message analysis mechanism. The operations can receive, by the intermediary device via the electronic communications network, from a client computing device, a data message having a characteristic. The operations can intercept, by the data message replication mechanism, the data message to generate a replicated data message. The replicated data message can include the characteristic. The operations can generate, by the data message analysis mechanism, from the replicated data message and based on the characteristic, derivative content. The operations can combine, by the data message aggregator mechanism, the derivative content with the data message to create an enhanced data message. The operations can provide, by the intermediary device, the enhanced data message to the contact center agent computing device for display by the contact center agent computing device.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
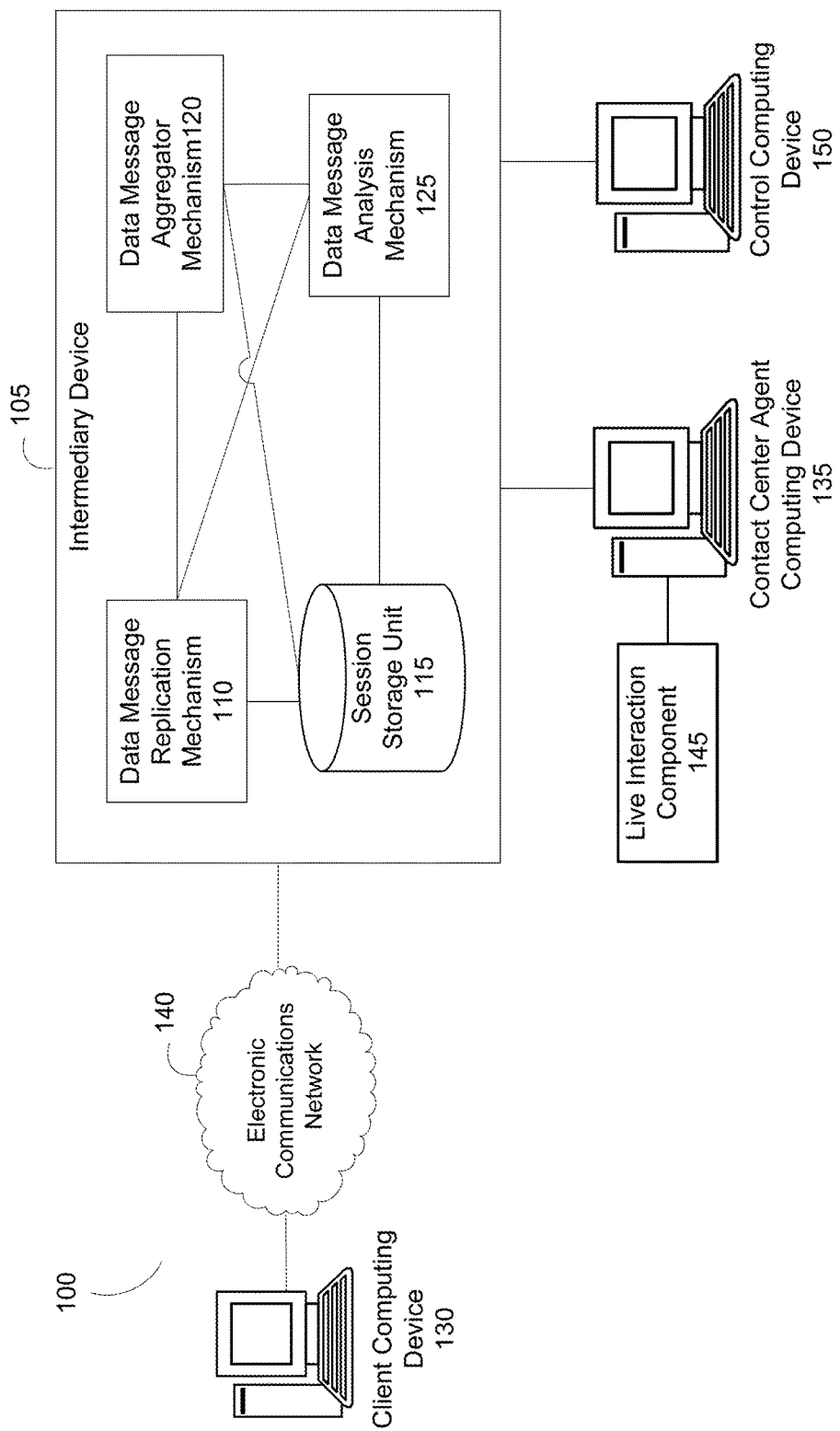
FIG. 1 is a block diagram of an example system that routes and enhances data messages in a contact center environment.

Following below are more detailed descriptions of various concepts related to, and implementations of, methods, apparatuses, and systems of data message routing, enhancement, or management in a contact center environment. The various concepts introduced above and discussed in greater detail below may be implemented in any of numerous ways.

Systems and methods of the present disclosure relate generally to an intermediary device for data message routing or enhancement, including network based data packet transmission, and corresponding systems, methods, and apparatuses. Text or other network based data messages can replace synchronous voice based communications (such as a live telephone call) to, for example, a contact center agent in a contact center environment. Routing, assigning to the appropriate destination, aggregating, modifying, enhancing, merging or associating individual data messages is a technical problem for an intermediary device that can be part of a data processing system in a contact center environment. For example, multiple text or other protocol based data messages can be asynchronous or time shifted. These data messages might be not be overtly linked with one another, such as a first data message to a cable company contact center about a bill and a second data message the next day to the same contact center, from the same source, that is about a change in address. Further, the data messages as originated from the source client computing device my not indicate derivative or supplemental information that could be used by the intermediary device to more directly route the data messages to the appropriate contact center agent computing device. There may be a number of contact center agent computing devices equipped to receive these data messages. Routing data messages to the incorrect or inappropriate contact center agent computing device, where they may need to be re-routed, leads to unnecessary increased computer network transmissions, increased network traffic and latency, unnecessary increased computer processing usage and a corresponding waste of electrical power.

The systems, devices, and methods described herein provide a technical solution to the above and other technical problems by, for example, employing one or more intermediary device to enhance or supplement data messages for routing or assignment to the appropriate destination (e.g., a contact center agent computing device) equipped to process or respond to the data message. The intermediary device and other system components such as a data message replication mechanism can intercept and replicate inbound or outbound data messages. The data message replication mechanism can generate a replicated data message (e.g., a copy of the data message). A data message analysis mechanism can generate analyze the replicated data message to generate derivative content. A data message aggregator mechanism can combine the derivative content with the data message to create an enhanced data message. The intermediary device can provide the enhanced data message to at least one contact center agent computing device for display to an agent in a contact center environment. The contact center agent computing device can generate a reply or response message to the enhanced data message, and provide the response message via the intermediary device (e.g., where derivative content or control data messages can be removed) to the client computing device that originated the original data message.

The generation and use of derivative content by an intermediary device that intercepts inbound data messages in a contact center environment results in reduced data transmissions, which saves bandwidth and reduces latency as the data messages are transferred more efficiently to the appropriate destination, e.g., with information that can conclude a communication session with reduced back and forth transmissions between client and contact center agent computing device than would otherwise occur. Further the intermediary device is a scalable and modular system. In a contact center environment with a node or tree-like structure to route data messages to final destinations, the intermediary device need not transmit data messages excessively to obtain information from the end user at a client computing device that can instead by indicated by the derivative content generated by the intermediary device.

The system and method provided by the intermediary device of enhancing or modifying data messages to include derivative content reduces the number of packet (or other protocol based) computer network transmissions that may otherwise occur due to inefficient routing to, for example, unnecessary additional data message communications or unnecessary transfers or hops to incorrect destinations (e.g., the wrong contact center agent computing device) before arriving at the correct destination. This saves bandwidth, reduces latency, saves power, and results in faster communication between the end user computing device and the correct contact center agent computing device.

FIG. 1 illustrates an example system 100 to route text based data messages. The system 100 can include at least one intermediary device 105. The intermediary device 105 can include at least one data message replication mechanism 110, at least one session storage unit 115, at least one data message aggregator mechanism 120, and at least one data message analysis mechanism 125. The intermediary device 105 can be or include one or more data processing systems, servers, virtual servers, or computing devices. The intermediary device 105 can include hardware (e.g., processors of one or more servers), as well as scripts or programs executed by the hardware, and combinations thereof. The intermediary device 105 can reside (e.g., be physically or logically disposed) in an electronic communication path between at least one client computing device 130 (or end user or customer computing device) and at least one contact center agent computing device 135. For example, the intermediary device 105 can communicate, (e.g., via a LAN, WAN, the internet, a cloud environment, or other computer network) with control computing devices 150, contact center agent computing devices 135 and with client computing devices 130. Data communication messages such as text messages or asynchronous voice messages (e.g., that are sent as a voicemail message and not part of a live conversation) can pass between an electronic communications network 140 and the contact center agent computing device 135, for example for display by the control computing device 150, the contact center agent computing device 135 or by the client computing device 130. The intermediary device 105 can enhance contact center operation by providing an operator of the contact center agent computing device 135 with the ability to live text with multiple client computing devices 130 during one time period, to effect continuous conversation with multiple end users during consecutive or intermittent time period that can range from seconds to days. The contact center agent computing device 135 can also be referred to as a messaging client computing device.

The intermediary device 105 can include the data message replication mechanism 110, the session storage unit 115, the data message aggregator mechanism 120, or the data message analysis mechanism 125 as part of one or more servers of a contact center system to assign, route, establish, modify, enhance or provide data messages between the client computing device 130 and the appropriate contact center agent computing device 135 from a plurality of candidate contact center agent computing devices 135. The data messages can be part of sessions that include asynchronous text, voice message, or data message (e.g., not a live voice conversation such as a telephone call) communications between an end user and a contact center agent (e.g., a person, bot, or combination thereof) related to a certain task, such as to change account information or to obtain customer service. In some examples, the intermediary device 105 can receive voice messages that have been sent as audio messages (voicemail) or converted into text messages. The sessions can occur continuously in a conversational manner, or can be intermittent, e.g., lasting over hours, days or weeks with dormant periods between communications. The intermediary device 105 can include at least one server. For example, the intermediary device 105 can include a plurality of servers located in at least one data center or server farm. The intermediary device 105 can receive data messages and can identify characteristics of those data message, for example as part of a contact center operation.

The intermediary device 105 can replicate or copy data messages for analysis. Based on characteristics of the data messages (or the replicated data messages), the intermediary device 105 or component thereof such as the data message analysis mechanism 125 can determine or generate derivative content for or of data messages. The derivative content can indicate attributes such as end user sentiment, emotions, source data, subject matter or topic area of the data messages, intended destination data, end user consent, end user identification data, intent, a relationship to a second data message, or a suggested contact center agent computing device 135 to receive the data message, among other information. The intermediary device 105 can combine (e.g., merge, integrate, associate, or append) the derivative message with the data message (or replicated data message) to create an enhanced data message. The intermediary device 105 can provide the enhanced data message to at least one contact center agent computing device 135 for display, e.g., via a live interaction component 145 of the contact center agent computing device 135. The data message analysis mechanism 125 can determine or identify the attributes indicated by the derivative content and can provide an indication of these attributes to the contact center agent computing device 135 or to the control computing device 150.

The intermediary device 105 can receive at least one control data message from the contact center agent computing device 135 or from the control computing device 150 that may or may not also function as a contact center agent computing device 135. The control data message can be a text based data message, and can have the same format as a corresponding data message. For example, the contact center agent computing device 135 can be operated by a contact center agent in a call or contact center environment to respond to data messages received from client computing devices 130. The control computing device 150 can be operated by a bot, script, or a supervisor of the agent, e.g., to provide control signals to data messages that can direct agent behavior. In some examples, the contact center agent computing device 135 can operate as the control computing device 150, e.g., whereby the agent or a script executing at the contact center agent computing device 135 can generate control signals.

The intermediary device 105 can also receive outbound (e.g., reply or response) data messages from the contact center agent computing device 135 intended for the client computing device 130 (for display to the end user). The response data message may include derivative content or control data messages. The intermediary device 105 can remove, strip, or disassociate the derivative content or control data messages from the response data message, and provide the response data message without the derivative content or control data messages to the client computing device 130 via the electronic communications network 140.

The intermediary device 105, the data message replication mechanism 110, the session storage unit 115, the data message aggregator mechanism 120, or the data message analysis mechanism 125 can each include at least one processing unit, server, virtual server, circuit, engine, agent, appliance, or other logic device such as programmable logic arrays configured to communicate with the session storage unit 115 and with other computing devices (e.g., the client computing device 130, the contact center agent computing device 135, or the control computing device 150). These communications can occur via the network 140. The intermediary device 105 can include the data message replication mechanism 110, the session storage unit 115, the data message aggregator mechanism 120, or the data message analysis mechanism 125 as a single device (data processing system) or as separate devices. For example, the data message replication mechanism 110, the session storage unit 115, the data message aggregator mechanism 120, or the data message analysis mechanism 125 can be distributed across one or more than one server or virtual server in data center(s) in one or more physical locations. The data message replication mechanism 110, the session storage unit 115, the data message aggregator mechanism 120, or the data message analysis mechanism 125 can be part of the same physical device (e.g., a server) or can be installed on separate devices. The data message analysis mechanism 125 can also be referred to as the message analysis appliance.

The intermediary device 105 can include at least one data processing system e.g., at least one logic device such as a computing device or server having a processor to communicate with at least one client computing device 130, at least one contact center agent computing device 135, or at least one control computing device 150. The intermediary device 105 can also communicate via the computer network 140 (e.g., that is or includes a LAN or other network) with at least one contact center agent computing device 135 in a call or contact center environment. The client computing device 130, the contact center agent computing device 135, and the control computing device 150 can include a desktop, laptop, tablet, smartphone, flip phone, personal digital assistant, server, virtual server, client, thin client, end user, mobile, or other computing device. The contact center agent computing device 135 (and the control computing device 150) can include a computing device workstation in a contact center or call center environment. The contact center agent computing device 135 and the control computing device 150 can include at least one live interaction component 145, e.g., a script that executes at the contact center agent or control computing device (or remotely) to provide a chat window, display, or other user interface at the contact center agent computing device 135 or at the control computing device 150.

The intermediary device 105 can connect with messaging networks 140 for the sending and receiving of text based messages. This connection can be made through either software based application programming interfaces, or telecom stack protocols such as short message peer to peer protocols. The intermediary device 105 supports connections to multiple networks 140. The messaging networks 140 and intermediary device 105 can exchange fixed length messages, in various text formats such as ASCII, XML and HTML that result in network traffic.

The client computing device 130, the contact center agent computing device 135, and the control computing device 150 can include user interfaces such as microphones, speakers, touchscreens, displays, keyboards, pointing devices, a computer mouse, touchpad, or other input or output interfaces. The client computing device 130, the contact center agent computing device 135, and the control computing device 150 can receive, display, modify, or transmit a variety of different data message types, such as text, binary, video, image, voice message, still photography or other types of rich content. The client computing device 130, the contact center agent computing device 135, and the control computing device 150 can initiate, transmit, or receive discrete communication elements such as text messages, chat messages, app based messages, emoji's, images, video clips and other rich media, e.g., from the intermediary device 105 or from the network 140.

The electronic communications network 140 can include computer networks such as the internet, local, wide, metro or other area networks, intranets, satellite networks, other computer networks such as voice or data mobile phone communication networks, and combinations thereof. The network 140 can include at least one messaging network that transmits text or other data messages that may but need not include the internet. The network 140 can carry or transmit various data message types, such as text, binary, video, image, still photography, hyperlinks, or active instructions to accomplish tasks, or other types of rich content for example. The intermediary device 105 can attach to or communicate with messaging networks 140 to establish communications sessions with a contact center on behalf of a network handle, such as @testcorp for a social network or +15085551212 for a short message service.

The data message replication mechanism 110, the session storage unit 115, the data message aggregator mechanism 120, or the data message analysis mechanism 125 can include, execute, or respond to at least one computer program or at least one script. The data message replication mechanism 110, the session storage unit 115, the data message aggregator mechanism 120, or the data message analysis mechanism 125 can be separate components, a single component, or part of the intermediary device 105. The data message replication mechanism 110, the session storage unit 115, the data message aggregator mechanism 120, or the data message analysis mechanism 125 can include combinations of software and hardware, such as one or more processors configured to receive data messages, intercept data messages, replicate data messages, generate replicated data messages and generate derivative content from the replicated data messages, combine the derivative content with the data messages to create enhanced date messages, provide enhanced date messages to contact center agent computing devices 135, receive response messages, remove derivative content or control messages from the response messages, and subsequently provide the response messages to client computing devices 130 responsive to the (original inbound) data message, for example.

The session storage unit 115 can include at least one local, remote, encrypted, unencrypted, or distributed database or memory (including any associated database management system), and combinations thereof that can receive and provide data to and from the intermediary device 105 or its components as well as the client computing device 130, the contact center agent computing device 135, or the control computing device 150. The session storage unit 115 can reside entirely or in part of at least one the intermediary device 105, the contact center agent computing device 135 or third party computing devices. The data messages can be stored in the session storage unit 115 as information blocks, and can indicate the parties to a data message or to a session, assignment state, keywords and other metrics or characteristics derived from the data message 205. The intermediary device 105 can manage the data blocks. Data corresponding to the data messages can be identified as expired, or can be removed, for example to protect confidential details such as financial or health care data. The intermediary device 105 can receive indications of changes in the session storage unit 115, can receive session objects (e.g., data messages or related information) from the session storage unit 115, and can provide the session objects to the contact center agent computing device 135 (e.g., the live interaction component 145) for visual display, for example to allow for responses from the agent at the computing device 135.

The system 100 can include the intermediary device 105 to enhance text based data messages and route or assign them to their destination (e.g., to the contact center agent computing device 135), and to receive, modify, and route response data messages to their destination (e.g., to the client computing device 130) in a contact center environment. For example, the intermediary device 105 can be disposed (e.g., in a data center or cloud environment) in a data communication path between the network 140 and the client computing device 130. The intermediary device 105 can be part of or in communication with a contact center environment. For example, all or part of the intermediary device 105 can be installed on one or more servers that provide services to a contact center. Portions of the intermediary device 105 such as scripts can be installed at the contact center agent computing device 135 or the control computing device 150. The intermediary device 105 can receive a text based data message. For example, via the network 140, the intermediary device 105 can communicate with (e.g., receive or transmit data messages to or from) at least one end user or client computing device 130.

The intermediary device 105 can receive a data message via the network 140. The data message can include a text message sent from the client computing device 130 to a contact center environment, e.g., intended for the contact center agent computing device 135. The intermediary device 105 can receive the data message via the network 140, which can include a fixed line (e.g., from the signaling channel of an acoustic modem), wireless network, internet, VoIP, cellular, PSTN, fiber optic, SMS or public or proprietary text messaging networks. The data message can be text or image based rather than a human or automated audio or voice transmission. The data message can also be an asynchronous voice transmission (e.g., a voicemail or voice message) that is recorded by the client computing device 130 and then transmitted, rather than a live voice conversation.

For example an end user at the client computing device 130 may have a question about a cable television bill and may send a text or other text-based data message, or a voicemail message, to a contact center to obtain assistance from a representative. This text based data message can be received by the intermediary device 105. The voicemail message can be translated to text by the client computing device 130 or by the intermediary device 105, or can be provided as an audio file. Data messages can be asynchronous, e.g., one-way, separated in time or having different subject matter content.

The text based data message can include one or more characteristics. Characteristics of the data message can indicate a source of the data message, such as the device from which the data message originated, a network account or social network account from which the data message originated, or an individual from which the data message originated. For example, packet or other protocol based transmissions of data messages can include a media access control address, network interface controller, Ethernet hardware address, programmed address, or other identifier that identifies the client computing device 130 (e.g., a smartphone or tablet).

For example, the characteristic can include a handle or other reference to a resource or username in a communication system (e.g., '@username' of a social network or communication service) or an email address. The characteristic can also include an account identifier (e.g., a phone number of a smartphone or identifier of a social media or email account), serial number, or other device identifier. The characteristic can accompany the text based data message transmitted from the client computing device 130 and received by the intermediary device 105, e.g., on behalf of a contact center. For example, the characteristic can be included within or appended to packet or other protocol based transmissions of the data message through the network 140. The characteristic can also be indicated by metadata or header information that is part of or transmitted with the data message.

The characteristic can also include or be indicated by subject matter of the data message. For example, intermediary device 105 can determine the characteristic of the data message from the subject matter (e.g., words, symbols, phrases, punctuation, abbreviations, misspellings, emojis, or keywords) of the data message that can indicate attributes such as an end user sentiment, such as happy, content, angry, upset, rushed, or annoyed.

The data message analysis mechanism 125 (or other intermediary device 105 component) 110 can parse or evaluate the data message (including any metadata such as a location, keyword, topic, or phone number) to identify at least one characteristic of the data message (e.g., subject matter of the data message, or an identifier of the end user or of the client computing device 130). For example, data messages can include source and destination addresses, formatted such as @thomas for social networks or +15085551212 for mobile telcom networks, along with the payload of the message, such as "I have a problem with my bill", and various meta-data about the message such as the time of creation, a unique identifier for the message, or a Boolean flag indicating whether or not the data message has been delivered before. Based on these characteristics, the data message analysis mechanism can identify characteristics of the data messages, and can generate corresponding derivative content, such as a sentiment analysis or determination for the data message. The handle identifier "@Thomas" and the destination identifier "@Cable Co" are examples and the characteristics of the data messages. The characteristics of the data message can include other identifiers, such as subject matter terms, a phone numbers of the client computing device 130, a device identifier of the client computing device 130, destination phone numbers or other identifiers of the entity that is associated with the data message (e.g., that the end user is trying to reach).

The characteristics of the data messages can indicate information about sources, destinations, logistics, timing information, or subject matter of the data messages. For example the characteristics can indicate a specific device (e.g., by device identifier), IP address, media access control address, unique identifier, or a type of device (e.g., a make, model, or brand of smartphone), or application. The data message analysis mechanism 125 (or other intermediary device 105 component) can identify characteristics of data messages as characteristics of application platforms, such as a particular text or chat messaging application, or social network, or a particular device or type of device. Different data messages can have different characteristics. For example, a first data message can include a characteristic of a first application platform indicating that the first data message was sent from a text message application that executes at the client computing device 130. The second data message can include a characteristic of a second application platform, indicating for example that the second data message was sent via a social network app. Despite the first and second data messages having characteristics corresponding to different application platforms (e.g., one was sent via text message, the other via a social media message), the intermediary device 105 can determine that both the first and second messages are part of the same session. For example, the intermediary device 105 can determine that the first and second messages have common subject matter (e.g., a complaint about a cable bill, or a helpdesk request to operate a device), or that both the first and second message originated from the same client computing device 130 (but via different apps).

The intermediary device 105 can intercept the data message. For example, the data message sent from the client computing device 130 may be sent to a phone number (or other destination identifier such as social media account) of a contact center. Prior to receipt of the data message by a contact center agent computing device 135 associated with the destination identifier, the data message replication mechanism 110 (or other intermediary device 105 component) can intercept (e.g., receive, hook, access, or otherwise obtain) the data message. The data message replication mechanism 110 can copy or replicate the data message to generate a replicated data message. The replicated data message can include the subject matter of the data message, and can also include an identifier indicating that it is a replication or indicating the source (or other information) of the data message. For example, the intermediary device 105 can tag the replicated data message with a unique identifier that indicates the source of the data message. The intermediary device 105 can tag the corresponding original data message with the same or a different (e.g., related) unique identifier indicating that the data messages are copies of one another. The data message replication mechanism 110 can provide the replicated data messages (including any identifiers) to the session storage unit 115 for storage and retrieval by components of the intermediary device 105. The identifiers can be stored with the data messages or liked to the data messages, e.g., via a lookup table.

The data replication mechanism 110 can fork (e.g., copy or replicate) the data message. The data replication mechanism 110 can provide (a copy of) the data message to the message analysis mechanism 125, and can provide (another copy of) the data message to the aggregator mechanism 120. For example, the data message replication mechanism 110 can include a tee connector to provide the data message to the data message analysis mechanism 125 and to the data message aggregator mechanism 120. The data message replication mechanism 110 can include a processor, controller, or logic circuitry that can execute a script or application to hook or intercept the data message and provide copies of the data message (e.g., via the tee connector) to the data message analysis mechanism 125 or to the data message aggregator mechanism 120. For example, the intercepted data message can be tagged by the intermediary device 105 (or other device) with a globally unique identifier to track the original source of the duplicated data message before passing the original message to the aggregator mechanism 120. The original data message can then be duplicated and tagged with a second globally unique identifier and passed to the data message analysis mechanism 125.

The intermediary device 105 can generate, (e.g., identify, or obtain) derivative content of or corresponding to the data message. For example, the data message analysis mechanism 120 can parse or analyze the replicated data message or the original data message (or characteristics thereof) to identify derivative content. The derivative content can indicate a sentiment or other attribute of the end user at the client computing device 130 that originated the data message, or can indicate a topic or category of content of the data message, for example. The data message analysis mechanism 120 can link the derivative content with the data message (or replicated data message) and can provide the derivative content to the session storage unit 115 for storage and subsequent retrieval.

The intermediary device 105 can combine the derivative content with the data message to create an enhanced data message. For example, the data message aggregator mechanism 120 can combine, merge, link, append, or otherwise associate the derivative content with the data message to create the enhanced data message that includes both the data message and the derivative content. The enhanced data message can be one or more than one data packet (or other protocol based) data structure.

The intermediary device 105 can provide the enhanced data message to at least one contact center agent computing device 135 or control computing device 150. For example, via an interface the intermediary device 105 (or component thereof such as the data message aggregator mechanism 120) can transmit or send the enhanced data message via one or more than one electronic transmission between the intermediary device 105 and the contact center agent computing device 135 or the control computing device 150. The intermediary device 105 can also provide the enhanced data message to the contact center agent computing device 135 (or other device) by providing the enhanced data message to the session storage unit 115 for storage where is can be accessed by the contact center agent computing device 135 (or other device). For example, the contact center agent computing device 135 can query the session storage unit to access the enhanced data message. This query can be initiated by the contact center agent computing device 135 or can be responsive to an indication of the existence of the enhanced data message transmitted from the intermediary device 105 to the contact center agent computing device 135. The enhanced data message can be displayed by the contact center agent computing device 135 (or the control computing device), for example via the live interaction component 145.

The intermediary device 105 can provide information about the contact center agent computing devices 135 to the session storage unit. For example, in addition to data messages, derivative content, enhanced data messages and other information about the data messages, such as metadata, the session storage unit 115 can include data structures corresponding to one or more skill sets of particular, identified contact center agent computing devices 135. For example, a contact center agent computing device 135 can be tasked with responding to data messages about billing inquiries, or about address changes. The intermediary device 105 can provide this skill set information to the session storage unit 115 for storage. Components of the intermediary device 105 or other devices such as other contact center agent computing device 135 or the control computing device 150 can access the skill information to, for example, identify a contact center agent computing device 135 equipped to respond to a particular data message, such as a data message having subject matter that indicates an address change.

Figure 2:
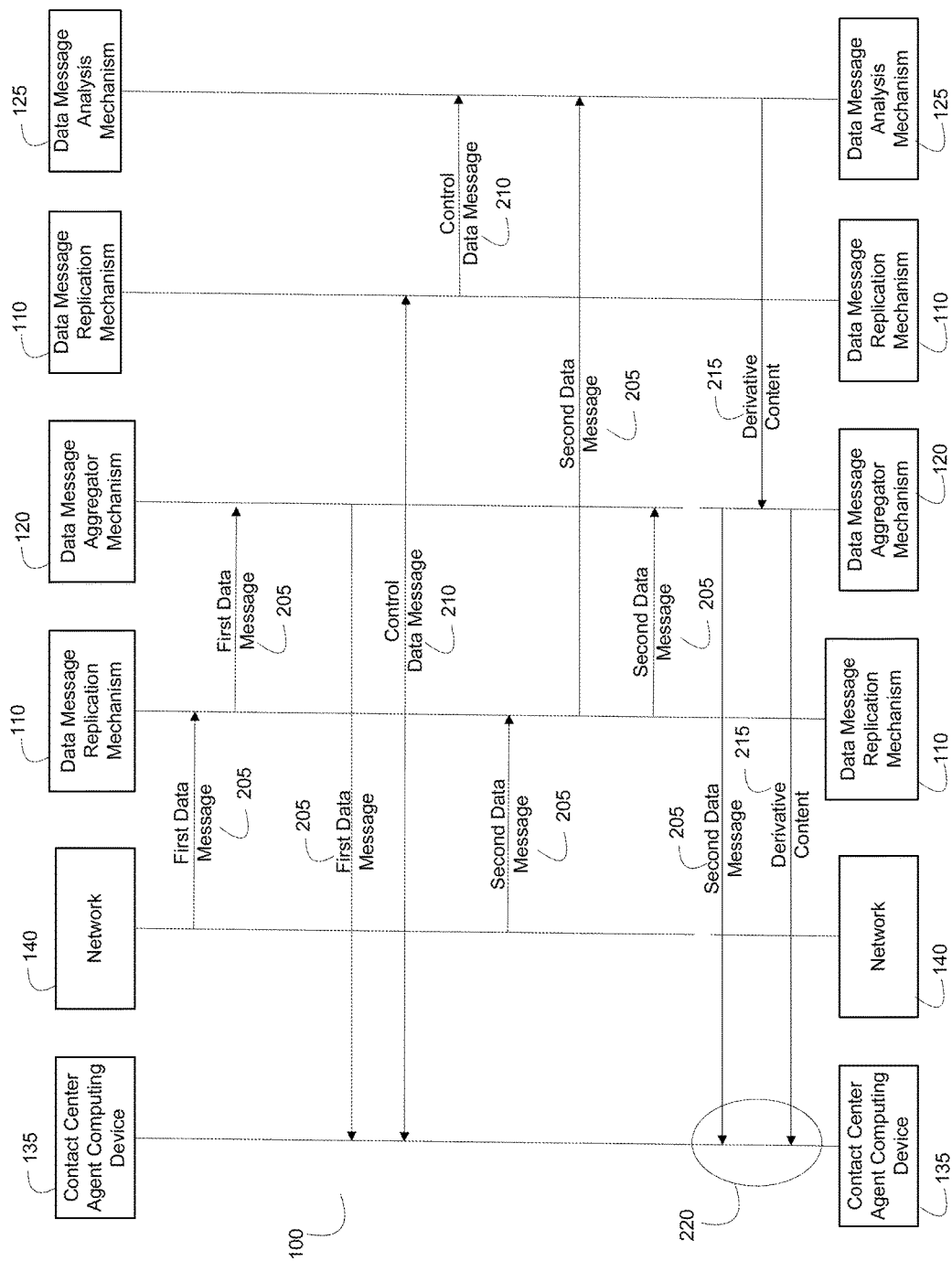
FIG. 2 is a functional diagram of an example system that routes and enhances data messages in a contact center environment.

FIG. 2 is a functional diagram of the example system 100 that enhances, modifies, or routes data messages. Referring to FIG. 1 and FIG. 2, among others, the system 100 can include a contact center environment (e.g., call center, customer service, or help desk environment that includes the capability to route, service, and respond to non-voice data message communications). The client computing device 130 can send at least one (first) data message 205 via the electronic communications network 140 to the data message replication mechanism 110. The data message 205 can include at least one characteristic, such as source, destination, subject matter, end user, or computing device 130 information from which derivative content can be identified. For example, the first data message 205 can include a message to an internet service provider contact center that states "I'm not happy with my internet service" and can include metadata or other information such as a user identifier, social media handle, or phone number that identifies the source of the first data message 205. The data message replication mechanism 110 can provide (e.g., a replication) of the first data message 205 to the data message aggregator mechanism 120. The data message aggregator mechanism 120 can provide the first data message 205 (with or without any control signals or derivative content) to the contact center agent computing device 135. For example, the data message aggregator mechanism 120 can transmit the first data message 205 to the contact center agent computing device 135, or to the session storage unit 115 where it can be accessed by the contact center agent computing device 135 (or by the control computing device 150).

The contact center agent computing device 135 (or control computing device) can generate at least one control data message 210 responsive to the first data message 205. For example, the control data message 210 can indicate a request to perform a sentiment analysis of the subject matter of the first (or any other) data message 205 to determine whether or not the end user associated with the first data message 205 (e.g., at the client computing device 130) is satisfied. The control data message 210 can be indicated by a character, word, phrase, or symbol (e.g., "/" or "#" or "ctrl:") indicating that the message is a control data message 210. The control data message 210 can operate as a command for the data message analysis mechanism 125 to analyze or parse the first data message 205 or another data message related to the first data message to identify derivative content (e.g., a predicted or estimated sentiment of the end user) responsive to the control data message. For example, responsive to receipt of the first data message (e.g., "I'm not happy with my internet service") the control data message 210 can include a text based message of "/enable sentiment". The intermediary device 105 or component thereof such as the data replication mechanism 110 or the data message analysis mechanism 125 can receive the control data message. The data message replication mechanism 110 can to receive the control data message 210 from the contact center agent computing device 135, replicate it, and provide a copy of the control data message to the data message analysis mechanism, where the copy of the control data message can be analyzed to create the derivative content 215. The control data messages 210, the derivative content 215 and copies thereof can be provided to the session storage unit for storage and access by system 100 components.

The control computing device 150 or contact center agent computing device 135 can provide the control data message 210 to the intermediary device 105 or component thereof. For example, the contact center agent computing device 135 can provide the control data message 210 (e.g., "/enable sentiment") with or with an indication of the corresponding first data message 205 to the data message replication mechanism 110, which can forward the control data message 210 (or a copy thereof) to the data message analysis mechanism 125. The intermediary device 105 can also provide the control data message to the session storage unit 115 for storage with an indication of the first data message 205 that corresponds to the control data message 210, where it can be accessed by the data message analysis mechanism 125. Thus, the intermediary device 105 can receive the first data message 205 (e.g., "I'm not happy with my internet service" and corresponding metadata) with an indication that the first data message corresponds to the control signal 210, (e.g., "/enable sentiment").

The intermediary device 105 can receive a second data message 205. For example, the second data message 205 can indicate "Now it is working" or "Now it works great!". The intermediary device 105 (or component thereof such as the data message replication mechanism 110) can receive the second data message 205 subsequent to receipt by the intermediary device 105 of the control data message 210. The first and second data messages 205 can be part of the same session or conversation with the contact center. For example, the first and second data messages 205 can originate from the same end user via the same or different end user computing devices 130 (e.g., the end user can send multiple data messages 205 from different devices but that indicate the same account number, social media handle, or other identifying information).

The data message replication mechanism 110 can receive the second data message 205, replicate the second data message 205, and provide the second data message 205 (e.g., the copy) to the data message analysis mechanism 125. Based, for example, on the session relationship between the first and second data messages 205, the data message analysis mechanism 125 can parse, evaluate, process, or otherwise analyze the second data message 205 (or any other data message of the session) to determine derivative content 215 responsive to the control data message 210. For example, responsive to the control data message 210, the data message analysis mechanism can determine derivative content 215 indicating a positive sentiment for the second data message 205 (or a negative sentiment for the first data message 205). For example, the derivative content 215 corresponding to the second data message 205 (and responsive to the control data message 210 requesting a sentiment analysis) can indicate "The customer is satisfied".

The data message aggregator mechanism 120 can receive the derivative content from the data message analysis mechanism 125, and can receive the second data message from the data message replication mechanism 110. The data message aggregator mechanism 120 can determine that the derivative content 215 corresponds to the second data message 205. For example, the data message aggregator mechanism 120 can determine that the second data message 205 belongs to a same session (to provide customer service to an end user) as the first data message 205 that triggered the control data message 210).

The data message aggregator mechanism 120 can combine the second data message (e.g., "Now it is working.") with the derivative content 215 ("The customer is satisfied.") to create at least one enhanced data message 220. The enhanced data message 200 may but need not be a single unitary or atomic message. For example, the enhanced data message 220 can include multiple components, e.g., one for the second data message 205 and one for the derivative content 215, as well as other source, destination, header, or metadata information. The enhanced data message 220 can include an identifier or other data construct that links the second data message 205 with the derivative content 215. The data messages and derivative content 215 that are included as the enhanced data message 220 can remain separate individual messages that are parts of the enhanced data message 220. The data message analysis mechanism 120 can create the enhanced data message 220 by modifying the data message 205 to include the derivative content 215. The data message aggregator mechanism 120 (or other intermediary device component) can provide the enhanced data message 220 (e.g., the second data message 205 and the derivative content 215 to the contact center agent computing device 135, where it can be received and displayed, e.g., via the live interaction component 145. The intermediary device 105 can provide the enhanced data message 220 to the contact center agent computing device 135 and not provide the enhanced data message 220 to the client computing device 130. The data messages 205 can be accessed by the live interaction component 145 of a contact center agent computing device 135.

The contact center agent computing device 135 can generate the control data message 210 responsive to the enhanced data message 220, or responsive to a standard un-enhanced data message 205 rendered at the contact center agent computing device 135. For example, the enhanced data message 220, which already includes derivative content 215 that may or may not have been generated responsive to a (first or previous) control data message 210, can be used by the contact center agent computing device 135 to generate a second control data message 210. The second control data message 210 can be different than the first control data message 210. The second control data message 210 can be received by the data message analysis mechanism 125 and used to identify additional (second) derivative content that can be linked or combined with another data message 210 to create another (second) enhanced data message 220.

The first and second data messages 205 are examples, and there can be any number (e.g., dozens or more) data messages 205 in one or more sessions. The first and second data messages 205 may but need not be consecutive data messages. For example, there can be intervening data messages of the same session (e.g., between the same source and destination, such as between one end user computing device 130 and one or more contact center agent computing devices 135). The derivative content 215 can be combined with any data message of the session to create the enhanced data message 220. The intermediary device 105 can determine derivative content 215 in the absence of the control data message 210. For example, the data message analysis mechanism 125 can be otherwise instructed or programmed to perform a sentiment, subject matter, source, or other characteristic analysis of inbound data messages to identify derivative content 215. The derivative content 215 can include text message (or other protocol) based content. For example, the derivative content 215 can have the same format or protocol as the data messages and can be transmitted before, after or concurrently with a corresponding data message. The derivative content 215 and the second data message 205 collectively can constitute the enhanced data message 220.

The data message replication mechanism 110 can receive the control data message 210 from the contact center agent computing device 125 (e.g., via the data message replication mechanism 110). The control data message 210 in this example can be generated responsive to the first data message 205. The intermediary device 105 or component thereof such as the data message replication mechanism 110 can receive a second data message 205, and can provide the second data message 205 to the data message analysis mechanism 125. The data message analysis mechanism 125 can generate derivative content corresponding to the second data message, based on a topic (e.g., a sentiment analysis) indicated by the control data message 210. The intermediary device 105 can provide this derivative content 215 and the second data message 205 to the contact center agent computing device 135, (e.g., as the enhanced data message 220).

The control data message 210 corresponding to any data message 205 can be received by the intermediary device 105. For example the control computing device 150 (e.g., operating independently from the contact center agent computing device 135) can transmit the control data message to the intermediary device 105. This transmission of the control data message 210 may or may not be responsive to a specific data message 205. The data message aggregator mechanism 120 (or other intermediary device 105 component) can include or associate the control data message 210 with a specific data message (e.g., the first or second data message 205). the intermediary device 105 can provide the data message 205 with the control data message 210 to the contact center agent computing device (e.g., so that the operator of the contact center agent computing device 135 is aware of the control data message 210) or to the data message analysis mechanism (e.g., for the generation of corresponding derivative content 215).

The intermediary device 105 or component thereof such as the data message analysis mechanism 125 can generate the derivative content 215 responsive to or as instructed by the control data message 210. The data message aggregator mechanism 120 can provide the enhanced data message 220 including the second data message 205 and the derivative content 215 to the contact center agent computing device 135. The contact center agent computing device 135 can respond to the enhanced data message 220, e.g., by selecting or identifying (from a list of options) or generating (from agent input) a response data message. The response data message can be responsive to the second (or any other) data message 205. For example, the response data message could indicate "Glad your service is back up, can I help you with anything else?". The contact center agent computing device 135 can provide the response data message to the client computing device 130 using the network 140, via the intermediary device 105. The intermediary device 105 can remove, strip, restrict, or otherwise transmit the response data message without the derivative content 215 (and without any control signals) prior to providing the response data message to the client computing device 130. Thus, the response data message can be provided to the client computing device 130 without the control data message 210 and without the derivative content 215. The contact center agent computing device 135 can provide the response data message to the client device 130 using the network 140, bypassing the intermediary device 105, without the derivative content 215 and without the control data message 210.

The intermediary device 105 can receive a text based control data message from the contact center agent computing device 135, e.g., responsive to the enhanced data message 220 (or an unenhanced standard data message 205) received or displayed by the contact center agent computing device 135. The text based control data message (e.g., data message 210) can include a control command to enable sentiment analysis or other attribute, feature, or characteristic. The intermediary device 105 or component such as the data message analysis mechanism 125 can identify derivative content 215 for the same enhanced data message 220 or subsequent data messages 205 based on the text based control data message.

Providing the enhanced data message 220 that include the data message 205 and supplemental content (e.g., derivative content 215) to the contact center agent computing device 135 leverages the transfer or routing of prior data messages as, for example, the derivative content used to enhance a second data message 205 can be responsive to the control data message 210 that was created responsive to a prior, first data message 205. This results in more efficient or more direct routing or processing of data messages 205 and can lead to faster conclusions of sessions between the client computing device 130 and the contact center environment that includes the intermediary device 105. The more efficient routing and processing reduces the volume of computer network data transmissions and computer processing operations, which reduces latency, saves processing capacity, and saves electrical power relative to contact center environment that does not include enhanced data messages 220.

The intermediary device 105 in the contact center environment can determine that data messages are (or are not)

part of a pre-existing session. The session can be a text based communication session between the end user (at the client computing device 130) and a contact center agent or other representative at the contact center agent computing device 135. Multiple individual data messages 205 can be aggregated or clustered together to form or define a session. For example, a series of back and forth text messages between the client computing device 130 and the contact center agent computing device 135 that pertain to common subject matter such as a billing query can be identified by the intermediary device 105 as a session. Multiple, different data messages 205 from the same session can be associated with control data messages 210 and evaluated by the data message analysis mechanism 125 to determine derivative content 215. The intermediary device 105 can provide the sessions for storage in and retrieval from the session storage unit 115.

The intermediary device 105 can assemble or aggregate data messages 205 into logical groups called sessions. Unlike other real time communications modes like audio and video that have an explicit start and stop to a conversation, data messages via messaging based networks can be considered stateless, e.g., without explicit indications of beginnings and ends of conversations, such as disconnecting a voice call. The intermediary device 105 can mark the beginning and end of sessions, e.g., conversations. The intermediary device 105 can append newly received data messages 205 to a pre-existing session, or can create a new session for the data message 205. The data message aggregator mechanism 120 can create enhanced data messages that include data messages 205 as well as derivative content 215. The intermediary device 105 can also collect meta-data information about the source of the inbound data message 205, including characteristics such as the network identifier, subject matter, words, phrases, symbols, keywords, messaging network, device location, and in the case of social messaging or with end user consent, details such as the parties name or telephone number. The intermediary device 105 can send a confirmation receipt message to the originating party (e.g., the client computing device 130), responsive to receipt of a data message 205.

Figure 3:
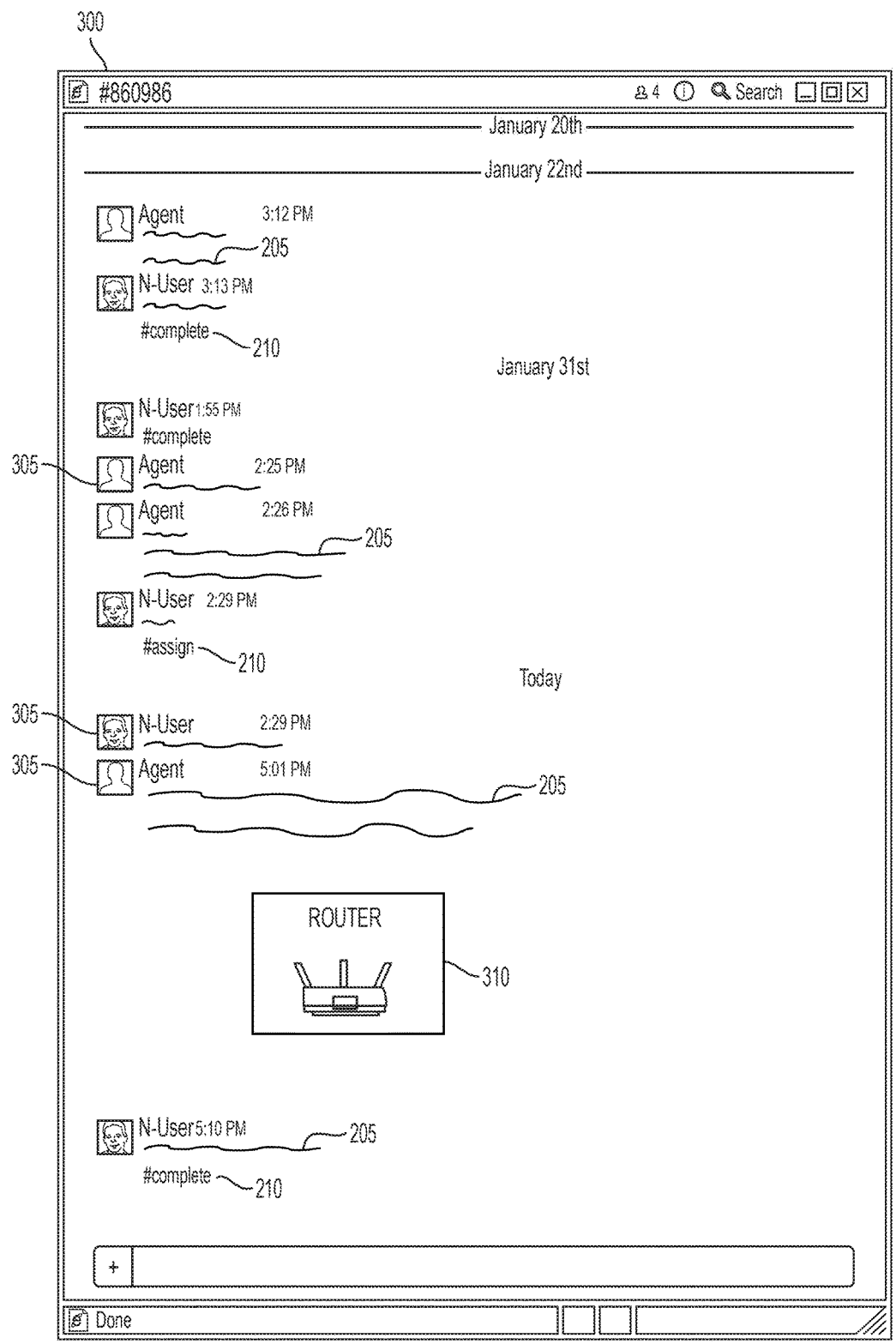
FIG. 3 is an example illustration of an enhanced data message display on a computing device in a contact center environment.

FIG. 3 is an example illustration of an enhanced data message display 300 on a computing device in a contact center environment. For example, the intermediary device 105 can provide the display 300 for rendering by the contact center agent computing device 135. The display 300 can include at least one control data message 210 with an identifier or text string, such as a '//' or a '##'. The intermediary device 105 can restrict, block, strip, or remove the control data message 210 so that the control data message 210 is not rendered by the end user computing device 145, so that an end user does not see the control data message 210. For example, the intermediary device 105 can strip or remove the control data message 210 from the outbound data message, or from a data stream or session that includes the outbound data message.

The display 300 can include a text or other data message conversation (including history) between an end user at the client computing device 130 and an agent, operator or receptionist at the contact center agent computing device 135, e.g., in a contact center environment. For example, the display 300 can include icons indicating contact center agents or end users, or data messages indicated in FIG. 3 by squiggly lines. The data stream or session can also include images 310 as part of the data messages 205. For example, the image 310 can be an image of a router that is the subject of a session or of data messages 205 of a session where the end user is having trouble connecting a router at home and contacts the router company contact center for assistance.

Figure 4:
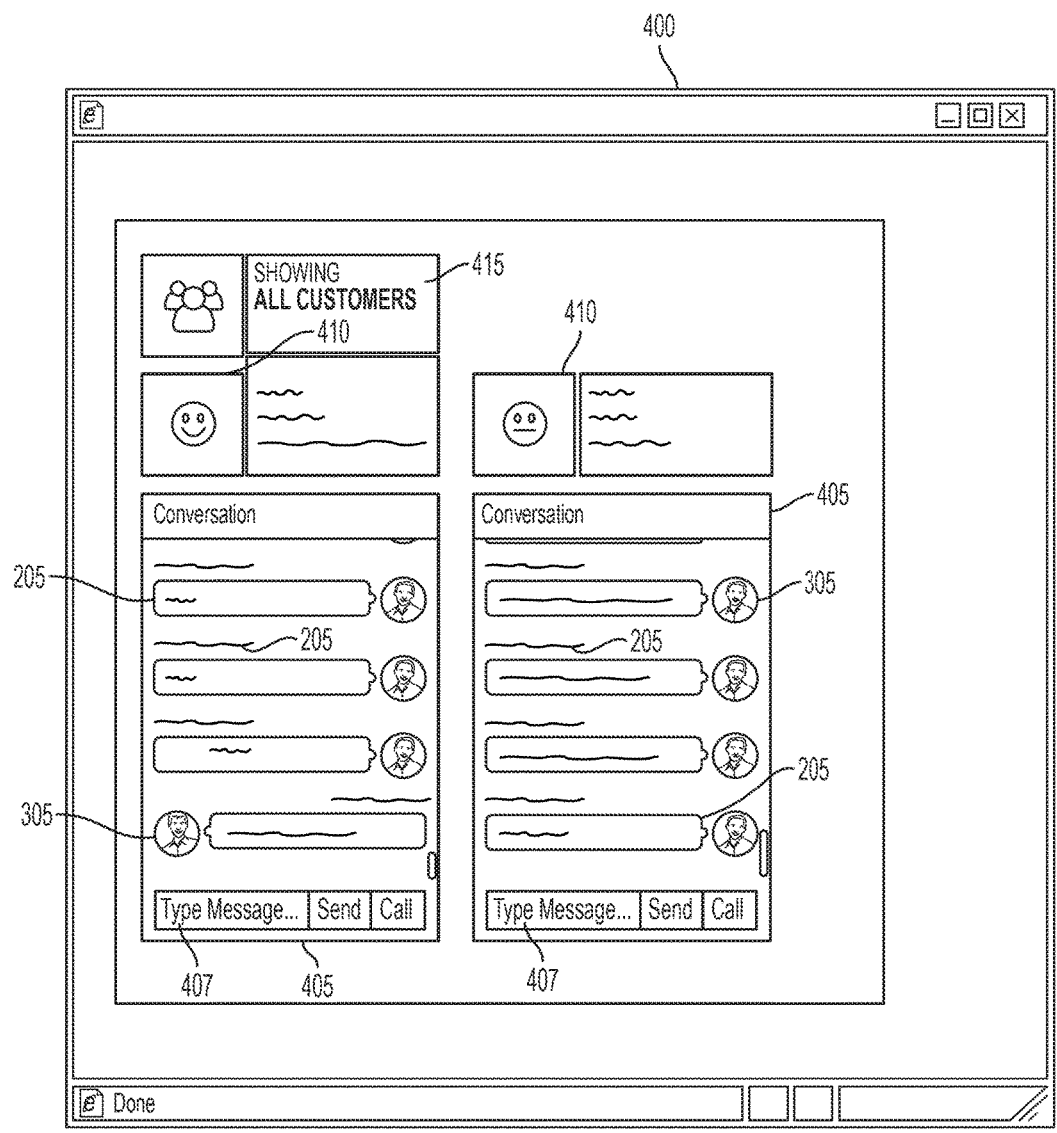
FIG. 4 is an example illustration of an enhanced data message display on a computing device in a contact center environment.

FIG. 4 is an example illustration of an enhanced data message display 400 on a computing device in a contact center environment. For example, the intermediary device 105 can provide the display 400 for rendering by the contact center agent computing device 135. The display 400 can include conversation cards 405. Each conversation card 405 can indicate a data message history with one or more than one end user. The conversations cards 405 can include an interface 407 where an operator of the contact center agent computing device 135 can enter a text or other data message 205. The status icon 410 can indicate a status of a conversation associated with at least on conversation card 405, such as pending, complete successful, or unsuccessful. The status icons 410 can indicate a sentiment of an end user or a status of the conversation, e.g., via a facial expression icon a color code scheme, or combinations thereof. For example, a status icon 410 indicating a smiley face can indicate a positive end user sentiment, and a status icon indicating a neutral or frowning face can indicate a neutral or negative user sentiment, respectively. A menu icon such as the all customers icon 415, when actuated by an operator of the contact center agent computing device 135, can toggle to a list, view, or rendering of all unassigned customers.

Figure 5:
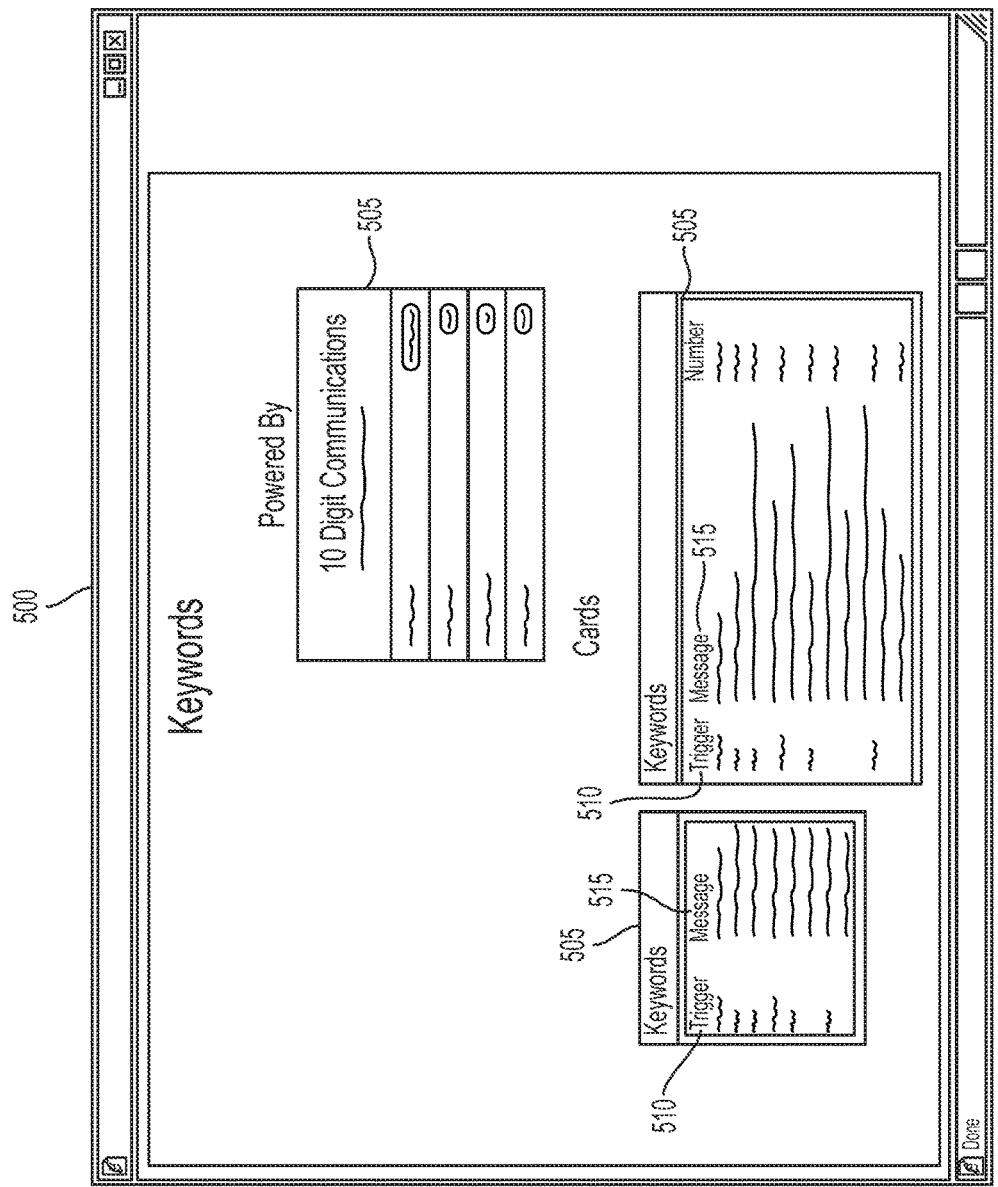
FIG. 5 is an example illustration of an enhanced data message display on a computing device in a contact center environment.

FIG. 5 is an example illustration of an enhanced data message display 500 on a computing device in a contact center environment. For example, the intermediary device 105 can provide the display 500 for rendering by the contact center agent computing device 135. The display 500 can include function cards 505. The function cards 505 can represent sources of intelligence, functionality, and integrations. In some examples, the standard application integration interface includes at least one data message stream, allowing for increased interoperability when integrated with other types of cards.

The function cards 505 can include keywords or phrases that can be selected by the contact center agent computing device 135 for transmission to the client computing device 130 responsive to at least one data message 205. The function cards 505 can include a trigger listing 510 and a message listing 515. The trigger listing 510 can indicate keywords or phrases, (e.g., "cable is out") and the message listing 515 can indicate prepared phrases (e.g., "did you check your connections?") that can be selected by the contact center agent computing device 135 as or for inclusion in data messages 205.

Figure 6:
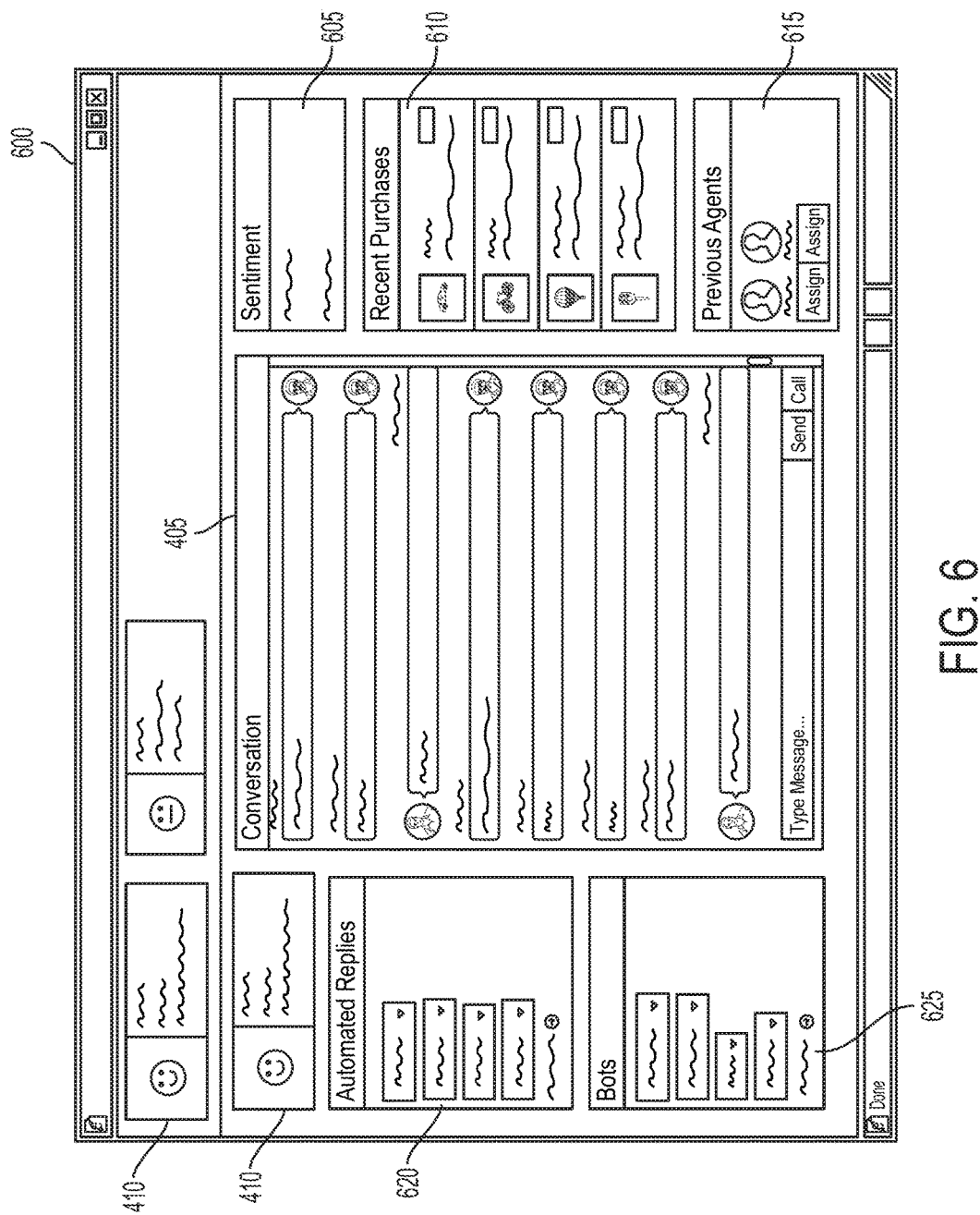
FIG. 6 is an example illustration of an enhanced data message display on a computing device in a contact center environment.

FIG. 6 is an example illustration of an enhanced data message display 600 on a computing device in a contact center environment. For example, the intermediary device 105 can provide the display 600 for rendering by the contact center agent computing device 135. The display 600 can include sentiment cards 605 that indicate a predicted, estimated, or known sentiment of an end user of the client computing device 130 (e.g., the originator of an inbound data message 205). For example, the intermediary device 105 can analyze words or other data from data messages 205 originated by the client computing device 130 (or from outbound data messages originated by the contact center agent computing device 135) to determine the sentiment of the end user (e.g., happy, sad angry, frustrated, upset, or content).

The display 600 can include recent purchase cards 610 indicative of recent purchases associated with the end user or with the client computing device 130. The display 600 can include previous agent cards 615 that identify prior agents that have had at least one conversation or data message 205 communication with the end user or with the client computing device 130. The prior conversations can be indicated in one or more conversation cards 405 and can be from a current session or past, completed sessions. The display 600 can include automated reply cards 620 that include standard phrases. An agent (e.g., human or bot operator) of the contact center agent computing device 135 can select a response from an automated reply card 620 that can be provided with or as an outbound data message via the intermediary device 105 for display by the client computing device 130. The display 600 can include bot cards 625. An operator of the contact center agent computing device 135 (e.g., a human agent) can select a bot card 625 that actuates to execute a script (locally at the contact center agent computing device 135 or remotely at the intermediary device 105 or the control computing device 150) to analyze data messages 205 from an end user and to generate a response, giving for example the appearance of a live conversation. The operator of the contact center agent computing device 135 can monitor this conversation and interject at any time.

Figure 7:
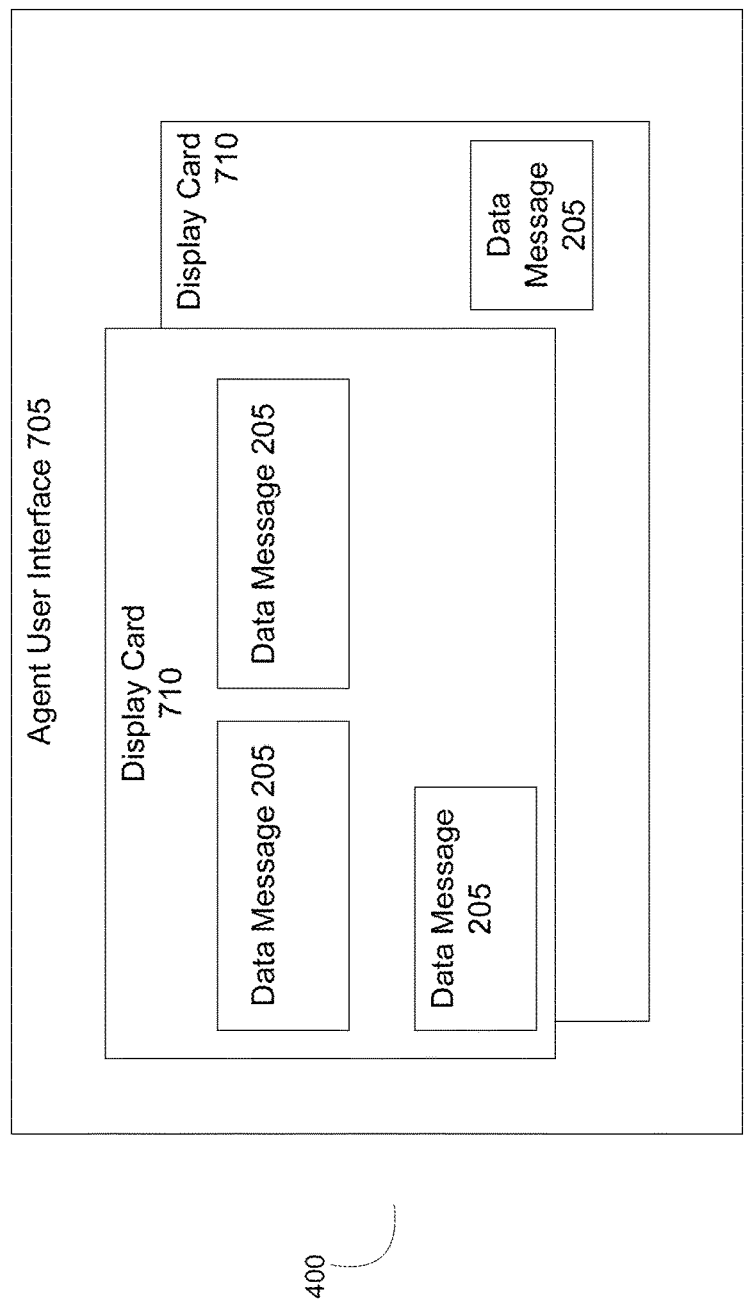
FIG. 7 is an example illustration of an enhanced data message display on a computing device in a contact center environment.

FIG. 7 depicts a data message display 700 on the contact center agent computing device 135 in, for example, a contact center environment. The display 700 can be rendered by the live interaction component 145 (e.g., a browser-based application) and can be part of or include the agent user interface 705 displayed to the agent operating the contact center agent computing device 135. Data messages 205, enhanced data messages 220, or other portions of the corresponding sessions can be displayed in at least one display (or other type of) card 710 of the agent user interface 705. The display card 710 can represent sessions that include the data messages 205 or portions thereof. The agent user interface 705 can include a plurality of display cards 710, each including at least one data message 205 of one or more sessions.

The intermediary device 105 can control the positioning, juxtaposition, and display of the display cards 710 or of the data messages 205 within the display cards 710. For example, the contact center agent computing device 135 (or the intermediary device 105) can execute a script or application (e.g., part of the intermediary device 105) that positions the display cards 710 (or other cards described herein) within the agent user interface 705 with defined borders so that they do not overlap each other. For example, card slots can be disposed in non-overlapping positions on the display 700. The contact center agent computing device 135 or the intermediary device 105 can also position the display cards 710 within the agent user interface 705 so that they do at least partially (e.g., partially or completely) overlap each other.

Display cards 710 associated with the same client computing device 130, or having content related to the same subject matter can partially overlap each other to preserve available display space on the display of the contact center agent computing device 135. The contact center agent computing device 135 (or the intermediary device 105) can execute a script or application that sorts or positions the display cards 710 based on categories associated with the display cards, such as subject matter, client computing device 130, urgency, or a time since the display card 710 was received, rendered, or last accessed by the client computing device 130. The agent user interface 705 or other display at the contact center agent computing device 135 that includes the display cards 710 can be browser based or non-browser based.

The intermediary device 105 can provide the data message 205 to the live interaction component 145 for display as the display card 710 by or within the agent user interface 705. The display card 710 can be displayed in juxtaposition with one or more additional display cards 710 within the agent user interface 705 of the contact center agent computing device 135. The display cards 710 can correspond to data messages 205 of different sessions, e.g., different asynchronous conversations between the agent at the contact center computing device 135 and different end users at different client computing devices 130. For example at least two of the display cards 710 can at least partially overlap each other in the agent user interface 705.

The agent or operator interfacing with the agent user interface 705 can select one or more data messages 205 from one or more display cards 710, and can respond to a data message 205 directly, e.g. via a response message to the client computing device 130, or can provide at least one data message to automated assistant for generation of an automated response. Via the agent user interface 705, the agent can also decline a display card 710 or data message 205.

The data message 205 or an indication of its existence can be stored in the session storage unit 115 with other data messages of one or more sessions. The data message 205 can be accessed by at least one live interaction component 145 of at least one contact center agent computing device 135. The live interaction component 145 can include a script or program that executes to display at least one display card 710 within the agent user interface 705 on the contact center agent computing device 135. The live interaction component 145 can be installed and can execute locally at the contact center agent computing device 135, or can be installed remotely (e.g., at a server in the data center independent of, associated with, or as part of the intermediary device 105) to provide the agent user interface 705 at the contact center agent computing device 135.

The intermediary device 105 or the contact center agent computing device 135 (e.g., executing a script or program that is part of or provided by the intermediary device 105) can sort any of the display cards 710 for display by the contact center agent computing device 135 based on categories associated with the display cards 710. The categories can be subject matter based, location based, hierarchical, or based on a defined criterion or parameter.

The enhanced data messages 220 can be provided for display as conversation cards, display cards, function cards, or sentiment cards within a browser based window at the contact center agent computing device 135. For example, each display (or other type of) card can represent one enhanced data message 220, or one conversation or communication with a corresponding client computing device 130. The browser based window can include a plurality of display cards, such as 10 or more cards simultaneously displayed. The displays of FIGS. 3-7, among others, are examples. The system 100 can generate, produce, transmit, or provide for display other displays and other forms of cards. The intermediary device 105 can create, generate, transmit, or provide for display any form of card.

Figure 8:
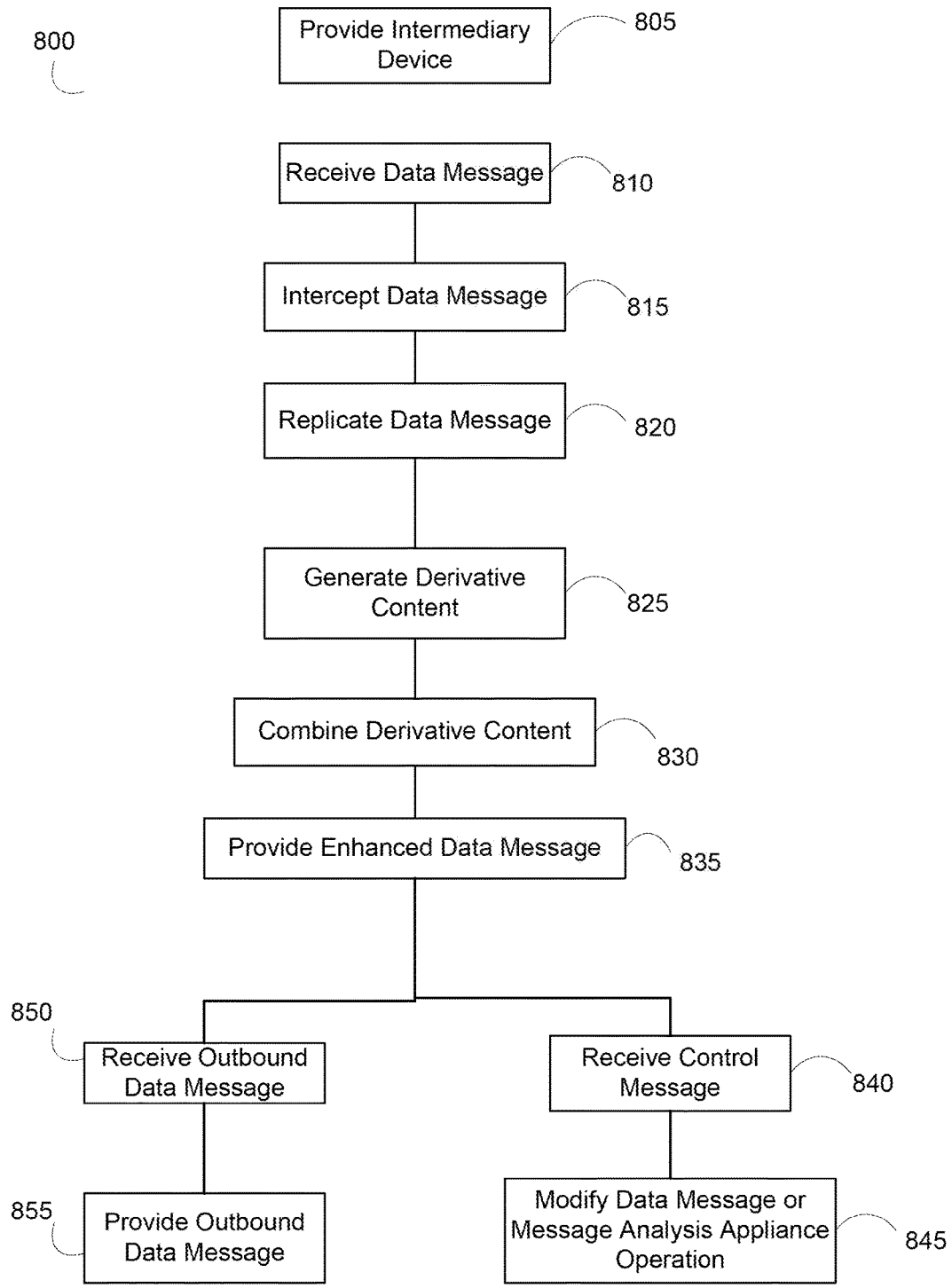
FIG. 8 is a flow diagram depicting an example method of managing data messages.

FIG. 8 depicts a method 800 of enhancing data messages. The method 800 can include providing the intermediary device 105 (ACT 805). The intermediary device 105 can be disposed in a data communication path between the electronic communications network 140 and the client computing device 130 or the contact center agent computing device 135 in a contact center environment. The intermediary device 105 can include at least one data message replication mechanism 110, at least one session storage unit 115, at least one data message aggregator mechanism 120, or at least one data message analysis mechanism 125.

The method 800 can include receiving data messages 205 (ACT 810). For example, the intermediary device 105 can receive data messages (ACT 810) originated by the client computing device 130, via the electronic communications network 140. The method 800 can intercept the data messages 205 (ACT 815) and can replicate the data messages 205 (ACT 820) to generate replicated data messages. For example, the intermediary device 105 (or component such as the data message replication mechanism 110) can identify and copy the data messages 205. The intermediary device 105 can provide the original or copied data messages to the session storage unit 115 for storage. The method 800 can generate derivative content (ACT 825). For example, the data message analysis mechanism 125 can parse the replicated data messages to identify derivative content such as information about the source of the replicated data message or a category of information associated with the replicated data message, such as sentiment data.

The method 800 can combine or otherwise integrate the derivative content with the data message 205 to create an enhanced data message (ACT 830). For example, the data message aggregator mechanism 120 or other intermediary device 105 component can combine, merge, or associate the derivative content with the (replicated) data message to create the enhanced data message. The method 800 can provide the enhanced data message (ACT 835). For example, the intermediary device 105 can provide the enhanced data message via a LAN, the internet, or other network to the contact center agent computing device 135 for display by the contact center agent computing device 135. The method 800 can also receive control messages (ACT 840) and modify the data message 205 or the operation of the message analysis appliance 110 based on the control messages (ACT 845). For example, the intermediary device 105 or component thereof can receive the control message from the contact center agent computing device 135 or from the control computing device 150 and the data message analysis mechanism 125 can change or modify operation based on a request, command, or instructions included or associated with the control message. The method 800 can receive outbound data messages 205 (ACT 850) and can provide the outbound data messages 205 (ACT 855). For example, the intermediary device 105 can receive the outbound data messages 205 from the contact center agent computing device 135 (e.g., alone or with control messages) and can provide the outbound data messages for display be the client computing device 130 (to the end user that originated the data message 205), e.g., without the control messages, via the electronic communications network 140. In this example, applications associated with the function of the electronic communications network 140 for data message transmission are not affected, modified, customized, altered or changed by intermediary device 105 activity, which logically occurs between the electronic communications network 140 and the contact center agent computing device 135.

The intermediary device 105 can manage messaging based communications in help desk, customer service, or other contact center settings between human members of an organization (e.g., contact center agents), automated assistants or bots and end users of the client computing devices 130. The intermediary device 105 facilitates data message 205 communications based on text messaging instead of live voice communications. The intermediary device 105 connects to one or more electronic communications networks 140, such as messaging networks, short message service networks, or social messaging networks, and establishes communications sessions whereby data messages 205 are transmitted between two or more parties, with the contact center agent computing device 135 using enhanced data messages to facilitate or hasten the conclusion of the session, which saves time and reduces bandwidth, processing power and electrical energy consumption by reducing the overall number of communications of the session. The intermediary device 105 can establish the sessions using messaging. The intermediary device 105 supports transitions to and from humans and automated assistants in a single session (or transmission of data messages 205).

By processing control data messages 210 and enhancing data messages 205 to with derivative content 215 to create enhanced data messages, the intermediary device 105 optimizes the ability for the contact center agent computing device 135 to control, direct or interpret the emotional content of the data messages 205, while maintaining the efficiencies of automation. Also, the intermediary device 105 can provide data messages 105 in an asynchronous manner, which provides substantial user experience benefits to the outside party (e.g., at the client computing device 130). For example, sessions 215 can last for days, but the end user at the client computing device 130 does not have to remain constantly engaged.

Figure 9:
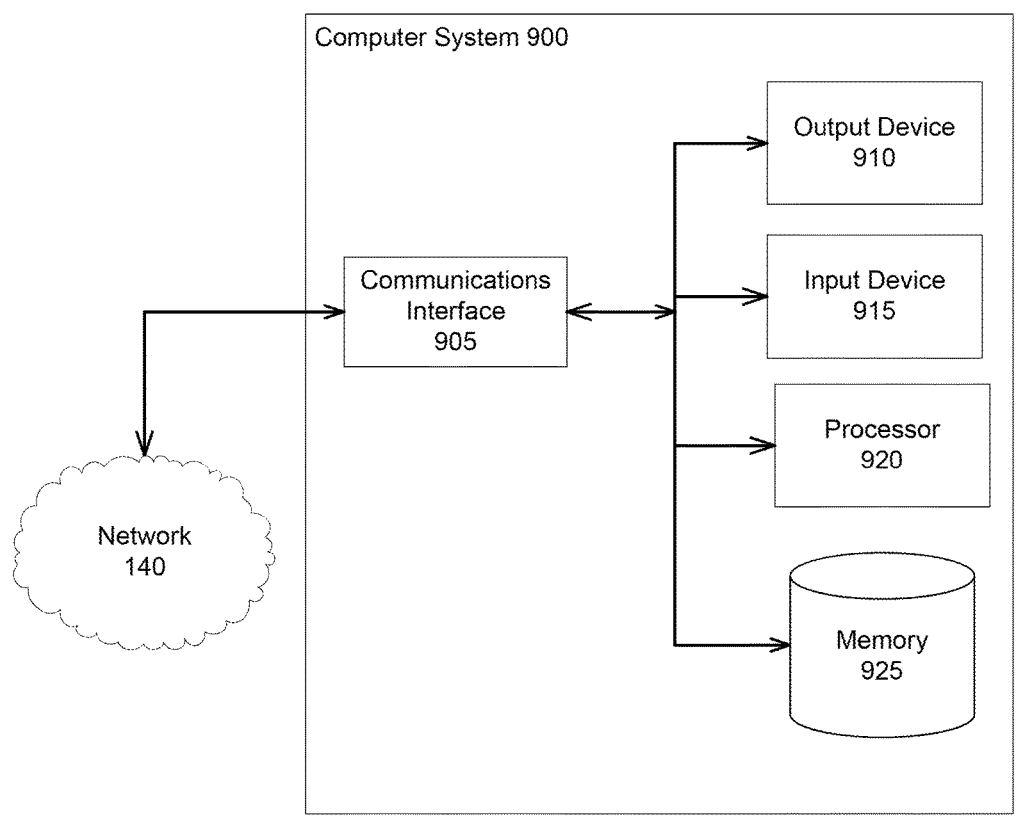
FIG. 9 is a block diagram illustrating a general architecture for a computer system that may be employed to implement elements of the systems and methods described and illustrated herein.

FIG. 9 shows the general architecture of an illustrative computer system 900 that can implement any of the computer systems discussed herein, including system 100 and the intermediary device 105 and its components such as the data message replication mechanism 110, the session storage unit 115, the data message aggregator mechanism 120, or the data message analysis mechanism 125. The computer system 900 can provide information via the network 140, for example to assign, modify, enhance, route, or supplement data messages to or from client computing devices 130 or contact center agent computing devices 135 in a contact center environment. The computer system 900 can include one or more processors 920 communicatively coupled to at least one memory 925, one or more communications interfaces 905, one or more output devices 910 (e.g., one or more display units) or one or more input devices 915. The processors 920 can be included in the intermediary device 105 or the other components of the system 100 such as the data message replication mechanism 110, the session storage unit 115, the data message aggregator mechanism 120, or the data message analysis mechanism 125.

The memory 925 can include computer-readable storage media, and can store computer instructions such as processor-executable instructions for implementing the operations described herein. The system 100, or the intermediary device 105, the data message replication mechanism 110, the session storage unit 115, the data message aggregator mechanism 120, or the data message analysis mechanism 125, the client computing device 130, or the contact center agent computing device 135 can include the memory 925 to store data messages, message characteristics, derivative content, data message sessions, or session data associated with the contact center environment or with communications between the client computing device 130 and the contact center agent computing device 135, for example. The at least one processor 920 can execute instructions stored in the memory 925 and can read from or write to the memory information processed and or generated pursuant to execution of the instructions.

The processors 920 can be communicatively coupled to or control the at least one communications interface 905 to transmit or receive information pursuant to execution of instructions. For example, the communications interface 905 can be coupled to a wired or wireless network (e.g., network 140), bus, or other communication means and can allow the computer system 900 to transmit information to or receive information from other devices (e.g., other computer systems). One or more communications interfaces 905 can facilitate information flow between the components of the system 100. The communications interface 905 can (e.g., via hardware components or software components) to provide a website or other interface (e.g., the live interaction component 145) as an access portal to at least some aspects of the computer system 900 or system 100. Examples of communications interfaces 905 include user interfaces.

The output devices 910 can allow information to be viewed or perceived in connection with execution of the instructions. The input devices 915 can allow a user to make manual adjustments, make selections, enter data or other information, or interact in any of a variety of manners with the processor during execution of the instructions.

The subject matter and the operations described herein can be implemented in digital electronic circuitry, or in computer software, firmware, or hardware, including the structures disclosed in this specification and their structural equivalents, or in combinations of one or more of them. The subject matter described in this specification can be implemented at least in part as one or more computer programs, e.g., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing system or apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "data processing system" or "computing device" "mechanism" "appliance" "module" "intermediary device" "engine" or "component" encompasses apparatuses, devices, and machines for processing data, including by way of example a programmable processor, a computer, a system on a chip, or multiple ones, or combinations, of the foregoing. The apparatuses can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination thereof. The apparatus and execution environment can realize various different computing model infrastructures, such as web services, distributed computing and grid computing infrastructures. The system 100 and components such as the intermediary device 105 can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers of the intermediary device 105 that are located at one site or distributed across multiple sites and interconnected by a communication network.

The processes and logic flows described in this specification can be performed by one or more programmable processors executing one or more computer programs (e.g., components of the intermediary device 105) to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit). The components of the system 100 can be interconnected by any form or medium of digital data communication, e.g., a communication network. Examples of communication networks include a local area network ("LAN") and a wide area network ("WAN"), an inter-network (e.g., the internet), or peer-to-peer networks (e.g., ad hoc peer-to-peer networks).

The subject matter described herein can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or a combination of one or more such back-end, middleware, or front-end components.

The computing system such as system 100 can include clients and servers. A client and server are generally remote from each other and typically interact through a communication network (e.g., the network 140). The relationship of client and server can arise by virtue of computer programs running on the respective computers and having a client-server relationship to each other. In some implementations, a server transmits data (e.g., a data message) to a client device (e.g., to the client computing device 130 or to the contact center agent computing device 135 for purposes of displaying data to and receiving user input from a user interacting with the client device 130 or an agent interacting with the contact center agent computing device 135). Data generated at the client computing device 130 or at the contact center agent computing device 135 (e.g., a result of the user or agent interaction) can be received from the client computing device 130 or the contact center agent computing device 135 at the server (e.g., received by the intermediary device 105).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the data message replication mechanism 110, the session storage unit 115, the data message aggregator mechanism 120, or the data message analysis mechanism 125 can be a single module, a logic device having one or more processing circuits, or part of one or more servers of the intermediary device 105.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, or claims. Accordingly, neither the reference signs nor their absence have any limiting effect on the scope of any claim elements.

The systems and methods described herein may be embodied in other specific forms without departing from the characteristics thereof. For example, the data message analysis mechanism 125 (or other intermediary device mechanism) can be distributed across multiple servers, or the data message replication mechanism 110 and the data message replication mechanism 110 (or other intermediary device mechanism) can be on separate servers or different computing devices of the intermediary device 105, which increases scalability and speed of the intermediary device 105 due to distributed or parallel processing.

The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. An intermediary device that enhances data messages between end user client computing devices and contact center agent computing devices in a contact center environment, comprising:

an intermediary device disposed in a data communication path of a contact center between an electronic communications network and a contact center agent computing device, the intermediary device including at least one of a data message replication mechanism, a data message aggregator mechanism, and a data message analysis mechanism;

the intermediary device to receive via the electronic communications network, a first data message having a first characteristic;

the data message replication mechanism to intercept the data message and to replicate the first data message to generate a replicated data message, the first replicated data message having the first characteristic;

the intermediary device to receive via the electronic communications network, a second data message having a second characteristic;

the data message replication mechanism to intercept the second data message and to replicate the second data message to generate a second replicated data message, the second replicated data message having the second characteristic;

the data message analysis mechanism to determine a session relationship between the first data message and the second data message;

the data message analysis mechanism to generate, in response to the determination of the session relationship between the first data message and the second data message, from the first replicated data message and the second replicated data message and based on the first characteristic and the second characteristic, derivative content including at least one of an emotion attribute and a sentiment attribute of the second replicated data message;

the data message aggregator mechanism to generate an enhanced data message by combining the derivative content generated from the first replicated data message and the second replicated data message with the second data message received via the electronic communications network, the derivative content and the second data message both forming the enhanced data message; and the intermediary device to provide the enhanced data message to the contact center agent computing device in the contact center environment for display by the contact center agent computing device.

2. The intermediary device of claim 1, comprising:
the data message analysis mechanism to determine, based on the first characteristic and the second characteristic, an attribute corresponding to a client computing device, the first characteristic and the second characteristic each referencing the client computing device; and
the intermediary device to provide an indication of the attribute to at least one of the contact center agent computing device and a control computing device of the contact center.

3. The intermediary device of claim 1, comprising:
the intermediary device to update a session storage unit with a data structure that indicates a skill set corresponding to the contact center agent computing device.

4. The intermediary device of claim 1, comprising:
the intermediary device to tag the second replicated data message with a unique identifier that indicates a source of the second data message.

5. The intermediary device of claim 1, comprising:
the data message analysis mechanism to generate the derivative content indicating to at least one of a topic area, end user consent, intent, a relationship to the second data message, a suggested contact center agent computing device, and subject matter of the first data message.

6. The intermediary device of claim 1, wherein the derivative content is first derivative content, comprising:
the data message replication mechanism to receive a control data message from the contact center agent computing device, the control data message generated responsive to the first data message;
the intermediary device to receive the second data message and to generate second derivative content corresponding to the second data message, the second derivative content corresponding to a topic indicated by the control message; and
the intermediary device to provide the second data message and the second derivative content to the contact center agent computing device.

7. The intermediary device of claim 1, comprising:
the intermediary device to receive, from a control computing device of the contact center, a control data message for the first data message;
the data message aggregator mechanism to include the control data message with the first data message; and
the intermediary device to provide the control data message with the first data message to at least one of the contact center agent computing device of the contact center and the data message analysis mechanism.

8. The intermediary device of claim 1, comprising:
the intermediary device to receive, from at least one of the contact center agent computing device and a control computing device of the control center, a control data message.

9. The intermediary device of claim 8, comprising the intermediary device to:

generate the derivative content responsive to the control data message;
provide the enhanced data message including the derivative content and the first data message and the second data message to the contact center agent computing device;
receive, from the contact center agent computing device, a response data message; and
provide the response data message without the derivative content to a client computing device.

10. The intermediary device of claim 1, comprising the intermediary device to:
provide the enhanced data message including the derivative content and the first data message and the second data message to the contact center agent computing device;
receive, from the contact center agent computing device, a response data message; and
provide the response data message without the derivative content to a client computing device.

11. The intermediary device of claim 1, wherein the data replication mechanism includes a tee connector.

12. The intermediary device of claim 1, comprising:
the data message analysis mechanism to receive, from at least one of the contact center agent computing device and a control computing device, a control data message.

13. The intermediary device of claim 1, wherein the derivative content is first derivative content, comprising:
the intermediary device configured to receive, from the contact center agent computing device, subsequent to display of the enhanced data message at the contact center agent computing device, a text based control data message responsive to the first data message; and
the intermediary device configured to identify second derivative content for the second data message based on the text based control data message.

14. The intermediary device of claim 13, wherein the data message aggregator mechanism modifies the second data message to include the second derivative content.

15. The intermediary device of claim 1, comprising:
the intermediary device configured to provide the enhanced data message for display by a display of the contact center agent computing device as part of a display card having defined borders within the display of the contact center agent computing device, in juxtaposition with a plurality of additional display cards; and
at least one of the intermediary device and the contact center agent computing device configured to control display of the display card and the plurality of additional display cards so as not to overlap with each other in the display.

16. A system that enhances data messages between end user client computing devices and contact center agent computing devices in a contact center environment, comprising:
an intermediary device, a data message replication mechanism, a data message aggregator mechanism, and a data message analysis mechanism;
the intermediary device disposed in a data communication path for a contact center between an electronic communications network and a contact center agent computing device;
the intermediary device to receive via the electronic communications network, a first data message having a first characteristic;

the data message replication mechanism to intercept the first data message and to replicate the first data message to generate a replicated data message, the replicated data message having the first characteristic;

the intermediary device to receive via the electronic communications network, a second data message having a second characteristic;

the data message replication mechanism to intercept the second data message and to replicate the second data message to generate a second replicated data message, the second replicated data message having the second characteristic;

the data message analysis mechanism to determine a session relationship between the first data message and the second data message;

the data message analysis mechanism to generate, in response to the determination of the session relationship between the first data message and the second data message, from the first replicated data message and the second replicated data message and based on the first characteristic and the second characteristic, derivative content including at least one of an emotion attribute and a sentiment attribute of the second replicated data message;

the data message aggregator mechanism to generate an enhanced data message by combining the derivative content generated from the first replicated data message and the second replicated data message with the second data message received via the electronic communications network, the derivative content and the second data message both forming the enhanced data message; and the intermediary device to provide the enhanced data message to the contact center agent computing device for display by the center agent computing device.

17. The system of claim 16, comprising:
the data message analysis mechanism to receive, from at least one of the contact center agent computing device and a control computing device, a control data message.

18. The system of claim 16, comprising:
the intermediary device to receive, from a control computing device of the contact center, a control data message for the first replicated data message;
the data message aggregator mechanism to include the control data message with the first replicated data message; and
the intermediary device to provide the control data message with the first replicated data message to the contact center agent computing device of the contact center.

19. A method of enhancing data messages routed between end user client computing devices and contact center agent computing devices in a contact center environment, comprising:

providing an intermediary device in a contact center environment, the intermediary device disposed in a data communication path of a contact center between an electronic communications network and a contact center agent computing device, the intermediary device including at least one of a data message replication mechanism, a data message aggregator mechanism, and a data message analysis mechanism;

receiving, by the intermediary device via the electronic communications network, from a client computing device, a first data message having a first characteristic;

intercepting, by the data message replication mechanism, the data message to generate a first replicated data message, the first replicated data message having the first characteristic;

receiving, by the data message replication mechanism, via the electronic communications network, a second data message having a second characteristic;

intercepting, by the data message replication mechanism, the second data message and to replicate the second data message to generate a second replicated data message, the second replicated data message having the second characteristic;

determining, by the data message analysis mechanism, a session relationship between the first data message and the second data message;

generating, by the data message analysis mechanism in response to the determination of the session relationship between the first data message and the second data message, from the first replicated data message and the second replicated data message and based on the first characteristic and the second characteristic, derivative content including at least one of an emotion attribute and a sentiment attribute of the second replicated data message;

generating, by the data message aggregator mechanism, an enhanced data message by combining the derivative content generated from the first replicated data message and the second replicated data message with the second data message received via the electronic communications network, the derivative content and the second data message both forming the enhanced data message; and providing, by the intermediary device, the enhanced data message to the contact center agent computing device for display by the contact center agent computing device.

20. The method of claim 19, comprising:
receiving, by the data message analysis mechanism, from at least one of the contact center agent computing device and a control computing device, a control data message.

* * * * *